United States Patent [19]

Pryor

[11] Patent Number: 6,020,280
[45] Date of Patent: *Feb. 1, 2000

[54] HIGH-LOADING ADSORBENT/ORGANIC MATRIX COMPOSITES

[76] Inventor: James Neil Pryor, 3253 Danmark Dr., West Friendship, Md. 21794

[*] Notice: This patent is subject to a terminal disclaimer.

[21] Appl. No.: 08/861,926

[22] Filed: May 22, 1997

Related U.S. Application Data

[63] Continuation of application No. 08/630,236, Apr. 10, 1996, abandoned, which is a continuation-in-part of application No. 08/451,606, May 26, 1995, abandoned.

[51] Int. Cl.⁷ .................................................. B01J 29/06
[52] U.S. Cl. ............................ 502/62; 428/34; 52/172; 52/786.13
[58] Field of Search .................. 502/60, 62; 428/34; 52/786.13, 172

[56] References Cited

U.S. PATENT DOCUMENTS

| | | | |
|---|---|---|---|
| 2,882,243 | 4/1959 | Milton | 252/455 |
| 2,882,244 | 4/1959 | Milton | 252/455 |
| 4,250,081 | 2/1981 | Bode et al. | 260/42 |
| 4,295,994 | 10/1981 | Kulprathipanj | 252/430 |
| 4,337,171 | 6/1982 | Kulprathipanja | 252/430 |
| 4,371,510 | 2/1983 | Christophliem | 423/329 |
| 4,414,111 | 11/1983 | Iwaisako et al. | 210/500.2 |
| 4,421,567 | 12/1983 | Kulprathipanj | 127/46.3 |
| 4,526,877 | 7/1985 | Acharya et al. | 502/60 |
| 4,529,541 | 7/1985 | Wilms et al. | 252/526 |
| 4,576,986 | 3/1986 | Kostinko | 524/450 |
| 4,590,233 | 5/1986 | Erwied et al. | 524/357 |
| 4,604,372 | 8/1986 | Morishita et al. | 502/62 |
| 4,612,342 | 9/1986 | Kostinko | 524/450 |
| 4,807,419 | 2/1989 | Hodek et al. | 52/788 |
| 4,822,492 | 4/1989 | Chao et al. | 210/679 |
| 4,888,378 | 12/1989 | Kostinko | 524/450 |
| 4,920,090 | 4/1990 | Ritter et al. | 502/439 |
| 4,925,459 | 5/1990 | Rojey et al. | 155/16 |
| 5,120,600 | 6/1992 | Suppiah | 428/323 |
| 5,143,708 | 9/1992 | Nakazawa et al. | 423/328 |
| 5,177,916 | 1/1993 | Misera et al. | 52/172 |
| 5,255,481 | 10/1993 | Misera et al. | 52/172 |
| 5,350,785 | 9/1994 | Sander et al. | 524/100 |
| 5,413,975 | 5/1995 | Mueller et al. | 502/60 |
| 5,503,884 | 4/1996 | Meyer et al. | 428/34 |

FOREIGN PATENT DOCUMENTS 4109037  9/1992  Germany .

OTHER PUBLICATIONS

Hawley's Condensed Chemical Dictionary, Eleventh Edition Revised by N. Irving Sax and Richard J. Lewis Sr., p. 24 1987.

*Primary Examiner*—Thomas Dunn
*Attorney, Agent, or Firm*—Charles A. Cross

[57] ABSTRACT

Crystalline molecular sieves which comprise mostly single and/or twinned crystal particles can be loaded into organic matrices in comparatively high amounts with less viscosity buildup than molecular sieves conventionally used for such desiccant applications. Desiccant/organic matrix compositions made with the single and/or twinned crystal zeolites exhibit improved physical integrity and/or improved rheological and adsorption characteristics in comparison to conventional systems. The compositions are especially useful in insulated glass window spacer applications.

10 Claims, No Drawings

HIGH-LOADING ADSORBENT/ORGANIC MATRIX COMPOSITES

This is a continuation of application Ser. No. 08/630,236, filed Apr. 10, 1996 which is a continuation-in-part of U.S. Ser. No. 08/451,606, filed May 26, 1995, both now abandoned.

BACKGROUND OF THE INVENTION

Inorganic adsorbent materials, such as molecular sieves, zeolites, etc., have long been used to remove constituents from (gaseous and/or liquid) fluids. Zeolites such as zeolites A and X are widely used in desiccating and gas treatment applications.

The use of adsorbent materials in the form of a free flowing particulate (e.g. beads) well known. Such beads typically comprise the adsorbent material in combination with a binder. While inorganic binders are most often used, the use of organic binders in free flowing beads is also known and is of growing interest. Where an organic binder is used, it is naturally desired to minimize the organic content of the bead while maintaining sufficient physical integrity in the bead.

In other instances, the adsorbent may be placed in an organic matrix which is then applied to a surface. For example, in the window spacer structures disclosed in U.S. Pat. Nos. 5,177,916 and 5,255,481, the adsorbent material is loaded into an organic matrix which is then adhered to the spacer. The adsorbent is typically incorporated into the organic matrix by mechanical mixing while the organic matrix material is in a very soft or molten state. It is generally desirable to incorporate as much of the adsorbent as possible per unit of organic matrix so as to enhance the adsorption performance of the adsorbent/organic matrix composite as well as to reduce the cost of the composite in situations where the organic material is more expensive than the adsorbent. Unfortunately, the amount of adsorbent which can be loaded into the composite is often limited by viscosity buildup which occurs during incorporation of the adsorbent as well as by a loss of workability and/or physical integrity in the resulting composite where the composite is applied to a substrate as in the above mentioned window spacer structures.

The organic binder level requirement and/or viscosity buildup associated with commercial adsorbent molecular sieves is generally assumed to be constant and unalterable. While it might be possible to increase the adsorbent loading by developing specialized organic materials or additives, these alternatives are typically expensive. Thus, there is a need for new ways of minimizing organic content adsorbent/organic matrix (binder) compositions, yet with minimal sacrifice of physical integrity and/or workability in the resulting composite.

SUMMARY OF THE INVENTION

The invention overcomes the disadvantages of known inorganic adsorbent/organic matrix (binder) composites by the use of adsorbent molecular sieve particles wherein at least a substantial portion of particles are single (and/or twinned) crystal particles. The use of single crystal adsorbent particles allows higher adsorbent loading to be achieved with the resulting improved adsorption performance while maintaining or improving the physical integrity and/or workability of the resulting composite.

In one aspect, the invention encompasses compositions comprising molecular sieve particles in an organic matrix (binder) wherein at least a portion of the molecular sieve particles are in the form of single and/or twinned crystals. The molecular sieve particles are preferably zeolites. Preferably, the organic matrix is a thermoplastic organic material such as a so-called "hot melt" adhesive. The adsorbent/organic matrix compositions are preferably suitable for use in insulating glass window spacer applications.

In a further aspect, the invention encompasses free flowing bead compositions comprising molecular sieve particles in an organic matrix (binder) wherein at least a portion of the molecular sieve particles are in the form of single and/or twinned crystals.

These and other aspects of the invention will be described in further detail below.

DETAILED DESCRIPTION OF THE INVENTION

The invention encompasses the concept that the loading of molecular sieve adsorbents (especially zeolite desiccants) in an organic matrix (binder) can be increased from loadings possible with commercial molecular sieves conventionally used for desiccant applications. This result is made possible by the use of molecular sieves which contain a substantial amount of single and/or twinned crystal particles compared to molecular sieves normally used in desiccant applications.

The nature of most crystalline molecular sieve particles which are commercially available for desiccant applications is that a large portion (if not all) of the particles are polycrystalline particles wherein the crystals are intergrown. In comparison, the crystalline molecular sieves used in the invention comprise a substantial portion of single crystal and/or twinned crystal particles. Preferably, the crystalline molecular sieve component used in the invention compositions contains at least about 50% of single and/or twinned crystal particles. Most preferably, the crystalline molecular sieve component used in the invention compositions consists essentially of single and/or twinned crystal particles.

While the degree of single and/or twinned crystal character of molecular sieve particles can be determined by microscopic techniques, a "wetting" test has been developed to distinguish crystalline molecular sieves which have suitable single and/or twinned crystal morphology. In the wetting test, a 10 gram sample of crystalline molecular sieve powder (activated at 315° C. for 2 hours) is placed into a ceramic mortar. Water is then added dropwise to the powder while mixing the powder with a pestle. The water addition and mixing is continued until a rather distinct thixotropic endpoint is reached at which a slight shear applied to the damp powder (achieved by slowly turning the pestle on the surface of the powder) results in fluid flow of the mixture. The wetting test value is the mass of water (grams) required to reach the thixotropic endpoint. Wetting test values less than about 8.5 correspond to molecular sieves having mostly single and/or twinned crystal particles whereas values of 9 or more correspond to molecular sieves containing mostly intergrown polycrystalline particles.

The amount of the molecular sieve adsorbent incorporated into the organic matrix can vary depending on the desired desiccating capacity, the rheological properties of the specific organic matrix and the intended end application. For free flowing beads, the amount of adsorbent is preferably about 70–95 wt. % of the total composition, more preferably about 75–90 wt. %. For non-bead applications (e.g. adhesive applications), a loading of about 35–65 wt. % activated crystalline molecular sieve is preferred, more preferably about 40–60 wt. %.

The molecular sieves useful as the single and/or twinned crystal molecular sieves in the invention are preferably zeolites. Most preferably, the molecular sieves are selected from the group consisting of zeolite A (including varieties and modifications thereof such as zeolite 3A), zeolite X (including varieties and modifications thereof such as zeolite 13X), and mixtures thereof. While zeolites A and X have been used in desiccant/adsorbent applications previously, the A and X powders used for such purposes were polycrystalline in nature and have wetting test values in excess of 9. If desired, minor amounts of amorphous molecular sieves and/or polycrystalline molecular sieves having wetting test values outside the desired range may also be employed as an admixture. Preferably, such amorphous and/or polycrystalline molecular sieves represent less than 50 wt. % of the total molecular sieve component, more preferably less than 25 wt. %, most preferably less than 10 wt. %. Where zeolite 3A is used, preferably it has a high potassium content as described in U.S. patent application Ser. No. 08/451,629, filed on May 26, 1995.

The organic matrix (binder) component preferably contains an organic resin useful in desiccant/organic matrix (binder) composite applications. Examples of suitable matrix resins are described in U.S. Pat. Nos. 5,177,916 and 5,255,481. The invention is especially useful where the organic matrix contains a thermoplastic resin such as a hot melt adhesive. Preferred thermoplastic resins have a Brookfield viscosity (@ 190° C—ASTM D 3236) of about 2000–6000 cP (2.0–6.0 Pa-sec), more preferably about 3000–4000 cP. An alternate characteristic of preferable resins is that they have a viscosity at 124° C. of about 4000–8000 cP. Further alternative characteristics of preferable resins are that they have a melt flow index of about 100–200 and a softening point of at least 90° C. A preferred classes of resins are olefin copolymers and terpolymers such as described in U.S. patent application Ser. No. 304,312 filed on Sep. 13, 1994 the disclosure of which is incorporated herein by reference. Other suitable thermoplastic resins are disclosed in U.S. Pat. No. 5,503,884, the disclosure of which is incorporated herein by reference. Where the desiccant/matrix composition is to be formed into free flowing beads or granules, resins such as disclosed in U.S. Pat. Nos. 4,295,994; 4,337,171; 4,414,111; 4,920,090; and 5,120,600, the disclosures of which are incorporated herein by reference.

The organic matrix component may contain other additives such as tackifiers, antioxidants, coloring agents, etc. depending on the intended end use. The amount of tackifier use is preferably about 0–20 wt. % based on the total weight of the organic matrix component, more preferably about 5–15 wt. %. Polyisobutylene is a preferred tackifier. Depending on the particular end use, components other than the molecular sieve component and the organic matrix component may be present in the composition, however, preferably the compositions of the invention consist essentially of the molecular sieve component and the organic matrix component.

As noted above, most commercially available molecular sieves marketed for desiccant/adsorbent applications are predominantly polycrystalline in character such that they have a wetting test value of 9 or more.

The zeolite molecular sieves especially useful in the invention compositions (i.e. with wet test values <8.5) can be prepared under specific manufacturing conditions corresponding to those used to make certain detergent zeolites such as can be found in U.S. Pat. No. 4,371,510 or British Patent Specification 1,563,467. Where a 3A zeolite is desired, an NaA zeolite prepared in the manner described is simply exchanged with potassium using a conventional ion exchange technique such as disclosed in U.S. Pat. No. 2,882,243.

The compositions of the invention may be formed by any conventional blending method. Preferably, the ingredients of the organic matrix are combined together before addition of the adsorbent component. Where the organic resin used possesses thermoplastic or hot melt characteristics, the mixing is preferably conducted with heating (e.g., about 180°–310° F.) to reduce the viscosity of the organic resin. The single crystal adsorbent component is preferably thermally activated using conditions known in the art before it is combined with the organic matrix. Where multiple adsorbents are used, preferably the adsorbents are physically blended with each other before addition to the heated matrix.

Where the desiccant/matrix composition is to be formed into free flowing beads or granules, the techniques disclosed in U.S. Pat. Nos. 4,295,994; 4,337,171; 4,414,111; 4,920,090; and 5,120,600 or any known technique may be used to form the beads or granules.

Once the composition is formed, it can be applied to a desired substrate by any conventional technique or otherwise used as desired.

The aspects of invention are further illustrated by the following examples.

EXAMPLE 1

Zeolite 3A particles were prepared in accordance with the above mentioned patents which had a wet test value of 8.0 (Sample A). For comparison, two other 3A zeolites were prepared by techniques commonly used to make desiccant zeolites (i.e. method described in U.S. Pat. No. 2,882,243) to have wet test values of 9.3 (Sample B) and 10.1 (Sample C).

EXAMPLE 2

The zeolite 3A samples prepared in Example 1 were each separately compounded with an organic matrix comprising 90 wt. % ethylene/propylene/butene terpolymer (Eastman EASTOFLEX T1035) and 10 wt. % polyisobutylene tackifier to form 5 gallon samples at 40–60 wt. % zeolite loading using a Brabender mixer. The viscosity of the resulting compositions was measured at 124° C. and 800 sec$^{-1}$ shear rate.

A plot of viscosity vs. adsorbent loading for various adsorbent/organic matrix composites was made. The results clearly indicate that the single crystalline material (Sample A) exhibits significantly less viscosity than the polycrystalline zeolites at equivalent loading.

What is claimed is:

1. A free flowing granular composition comprising a particulate molecular sieve component in a thermoplastic organic resin matrix wherein said molecular sieve component contains zeolite particles and at least 50 wt. % of said zeolite particles are in the form of single and/or twinned crystals.

2. The composition of claim 1 wherein said composition contains 35–65 wt. % of said molecular sieve component.

3. The composition of claim 2 wherein at least 75 wt. % of said molecular sieve component consists of zeolite particles in the form of single and/or twinned crystals.

4. The composition of claim 3 wherein at least 50 wt. % of the molecular sieve component has a wetting test value of 8 or less.

5. The composition of claim 4 wherein said molecular sieve component consists essentially of zeolite particles in the form of single and/or twinned crystals.

6. The composition of claim 1 wherein said organic matrix contains a hot melt adhesive.

7. The composition of claim 1 wherein said single and/or twinned crystal zeolites include zeolites selected from the group consisting of zeolite A, zeolite X and mixtures thereof.

8. The composition of claim 1 wherein said composition contains 70–95 wt. % of said molecular sieve component.

9. The composition of claim 8 wherein said single and/or twinned crystal molecular sieve particles are zeolites selected from the group consisting of zeolite A, zeolite X and mixtures thereof.

10. The composition of claim 1 wherein said resin has a Brookfield viscosity at 190° C. of about 2000–6000 cP.

* * * * *